United States Patent [19]
Thuliez

[11] Patent Number: 6,015,022
[45] Date of Patent: Jan. 18, 2000

[54] ULTRA-LIGHT ROAD VEHICLE

[76] Inventor: Jean-Luc Thuliez, Montagu 30/ CH-2520, La Neuveville, Switzerland

[21] Appl. No.: 09/043,099
[22] PCT Filed: Oct. 22, 1996
[86] PCT No.: PCT/CH96/00371
§ 371 Date: May 29, 1998
§ 102(e) Date: May 29, 1998
[87] PCT Pub. No.: WO97/15484
PCT Pub. Date: May 1, 1997

[30] Foreign Application Priority Data

Oct. 23, 1995 [FR] France ................................. 95 12951

[51] Int. Cl.[7] .................................................. B62D 61/06
[52] U.S. Cl. ........................................ 180/210; 280/786
[58] Field of Search ............................ 180/210; 280/786, 280/787

[56] References Cited

U.S. PATENT DOCUMENTS

| 1,989,995 | 2/1935 | Martin | 180/210 |
|---|---|---|---|
| 2,383,611 | 8/1945 | Marcy | 180/210 |
| 4,448,278 | 5/1984 | Badsey | 180/210 |
| 4,484,648 | 11/1984 | Jephcott | 180/210 |
| 4,506,753 | 3/1985 | Wood, Jr. | 180/210 |

FOREIGN PATENT DOCUMENTS

| 2 687 352 | 8/1993 | France . |
|---|---|---|
| 2 694 240 | 2/1994 | France . |
| 30 27 072 A1 | 3/1982 | Germany . |
| 42 43 455 A1 | 6/1994 | Germany . |

*Primary Examiner*—Kenneth R. Rice
*Attorney, Agent, or Firm*—Davis and Bujold

[57] ABSTRACT

An ultra-light road vehicle, particularly an electrically powered one, wherein the weight of the basic construction is minimized so that the vehicle may be powered by batteries while having a standard degree of autonomy for the class of vehicles in question, and the space requirement of the vehicle is reduced for easier parking. For this purpose, the vehicle comprises a chassis (9) with a central hollow beam (12) consisting of an extruded profile section made of a lightweight material and forming a housing for batteries (52) and a driving engine (28), a body (8) consisting of a separate sealed hollow assembly mounted on the chassis, and two steerable wheels (17, 18) at the front and a drive wheel (15) at the back connected to the chassis via suspensions. The rear wheel (15) is mounted on pivotable arms (27) so that the vehicle can be converted from a normal position to a shortened position in which the wheel base is reduced. The pivotable arms (27) are substantially aligned with the central beam (12) when the vehicle is in the normal position, and at an angle thereto when the vehicle is in the shortened position.

25 Claims, 12 Drawing Sheets

ULTRA-LIGHT ROAD VEHICLE

The present invention concerns an ultra-light road vehicle comprising only a small number of components, specifically a vehicle of the type known as a "city car" for commuting use, in particular electrically propelled, comprising a supporting structure, two front wheels and one rear wheel mounted on this supporting structure by means of suspensions and a separate passenger compartment fitted on to this supporting structure, which comprises a hollow central beam.

Vehicles intended for use as city cars are already known, particularly electrically propelled. They are generally designed on the principle of miniaturization of standard automobiles. Thus they usually consist of a chassis or a self-supporting passenger compartment which fulfils the functions of a cabin for the occupants and a chassis carrying the wheel suspension arms, motor and all the peripheral components providing the drive, steering, safety equipment such as the braking system, etc.

These vehicles generally possess four wheels, which must be far enough apart, both longitudinally and laterally, that is to say, must form a wheelbase and track sufficient to guarantee a minimum degree of stability to the whole. As a consequence, their weight is considerable in spite of the use of lightweight materials, such as composites and thermoplastics, especially where the passenger compartment is concerned. Because of this weight, the quantity of energy required for propulsion is considerable, a particularly serious handicap for an electrically propelled vehicle, since accumulator batteries are heavy.

The greater the amount of energy required, the greater will be the size and weight of the necessary batteries. Since the possibilities for weight reduction of standard vehicles are limited, development continues to be oriented towards vehicles propelled by internal combustion engines until such time as lighter batteries come on to the market. At present, the net weight of vehicles of this type is so great that the energy required to provide them with optimum range for the function for which they are intended cannot be stored in the form of electrical energy, due to the weight of the storage media of this type of energy.

Apart from the problem of weight of present-day vehicles, the number of their component parts poses a further problem. A standard vehicle, relatively small and at the entry end of the range, comprises over 30,000 parts. The price of these parts, and above all their assembly costs, raises the cost of these vehicles to such a point that the concept of the "city car" ceases to be economically viable.

The German publication DE-30 27 072 A1 describes a three-wheeled vehicle comprising a central supporting structure, two rear drive wheels and one steerable front wheel. The passenger seats are arranged on either side of the central supporting structure.

In practice, it becomes apparent that three-wheeled vehicles having two wheels at the rear and one at the front are highly unstable, their road-holding on bends being much inferior to that of three-wheeled vehicles having two wheels at the front and one at the rear.

In addition, arranging the seats on either side of the central supporting structure results in a wide, cumbersome vehicle, incompatible with the concept of the city car.

This arrangement can also be dangerous for passengers in case of lateral impact, which may result in their being crushed against the central supporting structure.

The purpose of the present invention is to palliate these disadvantages by proposing a vehicle of the above-mentioned type, designed so as to lighten the basic structure to the maximum extent so that it can be driven by an electric motor, without reducing its effective range below the threshold where the vehicle would cease to be of interest. Its design also minimizes the space it occupies, especially when parking, and it is constructed from a reduced number of component parts.

The invention achieves this purpose in that the aforementioned hollow central beam is composed of an extruded constant section profile made of a lightweight material, in that the two front wheels steer and the rear wheel is the drive wheel and is located approximately in the prolongation of the axis of the aforementioned central beam, in that the drive motor and energy storage are located inside the aforementioned central beam, and in that the separate passenger compartment is fixed as a unit to the hollow central beam.

The vehicle will preferably possess two front plates and one rear plate, these plates being constructed so as to be lodged at least partially in the profiles sections of the aforementioned hollow central beam, the plates being adapted to carry the suspensions of the front wheels and the suspension of the rear wheel respectively.

The hollow central beam will preferably have the cross-section of an inverted T over its entire length, the lower surface being extended laterally by two lateral webs symmetrically arranged with respect to the median longitudinal plane of the beam.

This structure presents the advantage of being very economical to manufacture, by extrusion and cutting to desired length. The plates are lodged in the extremities of the hollow central beam and fixed by simple bolts, enabling quick and economical assembly or disassembly. Furthermore, the plates with the wheel suspensions and wheels can be treated as sub-assemblies suitable for pre-fitting, thereby simplifying final assembly of the vehicle.

The hollow central beam can accommodate accessories or components which are easily accessible by simply removing one or other of the plates.

In the preferred form of construction, the rear plate carries a support for the rear wheel, this support comprising a spring-suspension unit and two suspension arms of which one end is fixed to this plate by an axle and the other end carries the axle of the rear wheel, which is mounted between the aforementioned suspension arms.

In this form of construction, the rear plate carries one end of a spring-suspension unit, the other end being connected to the suspension arms of the rear wheel.

An advantage of the design is that the rear wheel suspension arm is so constructed as to enable the vehicle to take up a normal position or a shortened position, the pivoting forks carrying the wheel being arranged approximately in alignment with the axis of the central beam when the vehicle is in normal position, but inclined with respect to the central beam when in shortened position, this shortened position being attained by transmitting the drive to the rear wheel while the front, steerable wheels are simultaneously locked.

In the preferred form of construction, the pivoting forks are articulated to the rear plate and mounted on a transverse axle carrying an electric motor on the casing of which is fitted a cradle carrying the lower extremity of a spring-suspension unit of the suspension arm, the upper extremity of which is fixed to an arm rigidly fixed to the rear plate.

The cradle can carry two pins which extend laterally either side of the cradle and are constructed so as to engage with two hooks to lock the vehicle into its normal position. These hooks can swivel and are pivoted on a support carried by a cross-member linked to the two pivoting forks.

To maintain the vehicle in shortened position, the vehicle should preferably be equipped with a locking cylinder mounted between the motor and the cross-member carrying the hooks.

In the preferred form of construction, the vehicle possesses an arched bow constituting the frame of a seat, the extremities of this bow being provided with two flanges which engage in longitudinal grooves in the side webs of the central beam.

The hollow central beam will preferably house a sliding support to contain at least one accumulator battery for the electric propulsion motor.

An advantageous form of construction provides for the passenger compartment to be a cell made of synthetic material, of which at least one wall is double and incorporates air cushions.

An advantageous mode of construction of at least part of the passenger compartment is by a technique of rotational moulding, hollow moulding or blown extrusion.

A part at least of the side walls is double-skinned and incorporates integral air cushions which improve the safety of the occupants by acting as shock dampers and energy absorbers.

The passenger compartment is preferably mounted on the hollow central beam by means of studs engaged in the grooves.

It is advantageous that there should be four such studs, two each side of the hollow central beam being fixed, and the other two sliding in the aforementioned grooves.

In the preferred form of construction, the hollow central beam contains a sliding support containing at least one accumulator battery as the power supply to the electric motor, and the aforementioned sliding support is rigidly fixed to the rear plate.

The extruded hollow central beam, closed at both ends, and can advantageously function as a fuel tank to supply an internal combustion engine.

The passenger compartment will preferably be composed of several components assembled by welding, the welding seams constituting zones of reinforcement. The aforementioned passenger compartment constitutes a survival cavity connected to the hollow central beam by studs which are detachable in case of impact.

In an advantageous form of construction, the passenger compartment possesses lateral protuberances which serve as a step and as an energy absorber, and also has means to emit light from at least one source.

The present invention will be more easily understood by reference to the description of a preferred mode of construction and its variants, and to the attached drawings, in which.

Figure 1:
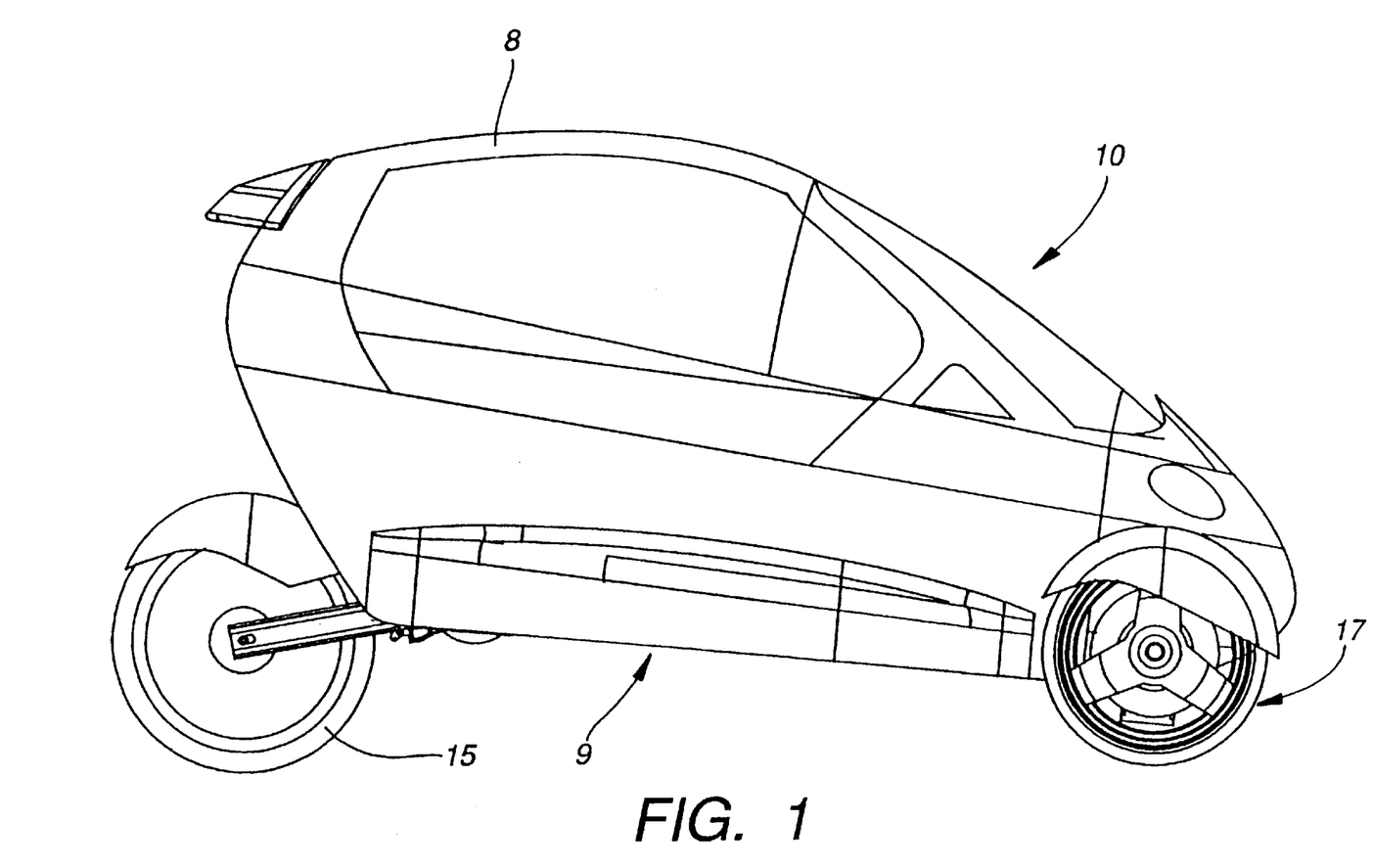
FIG. 1 represents an overall view of an elevation of the ultra-light road vehicle in accordance with the invention.
Figure 2:
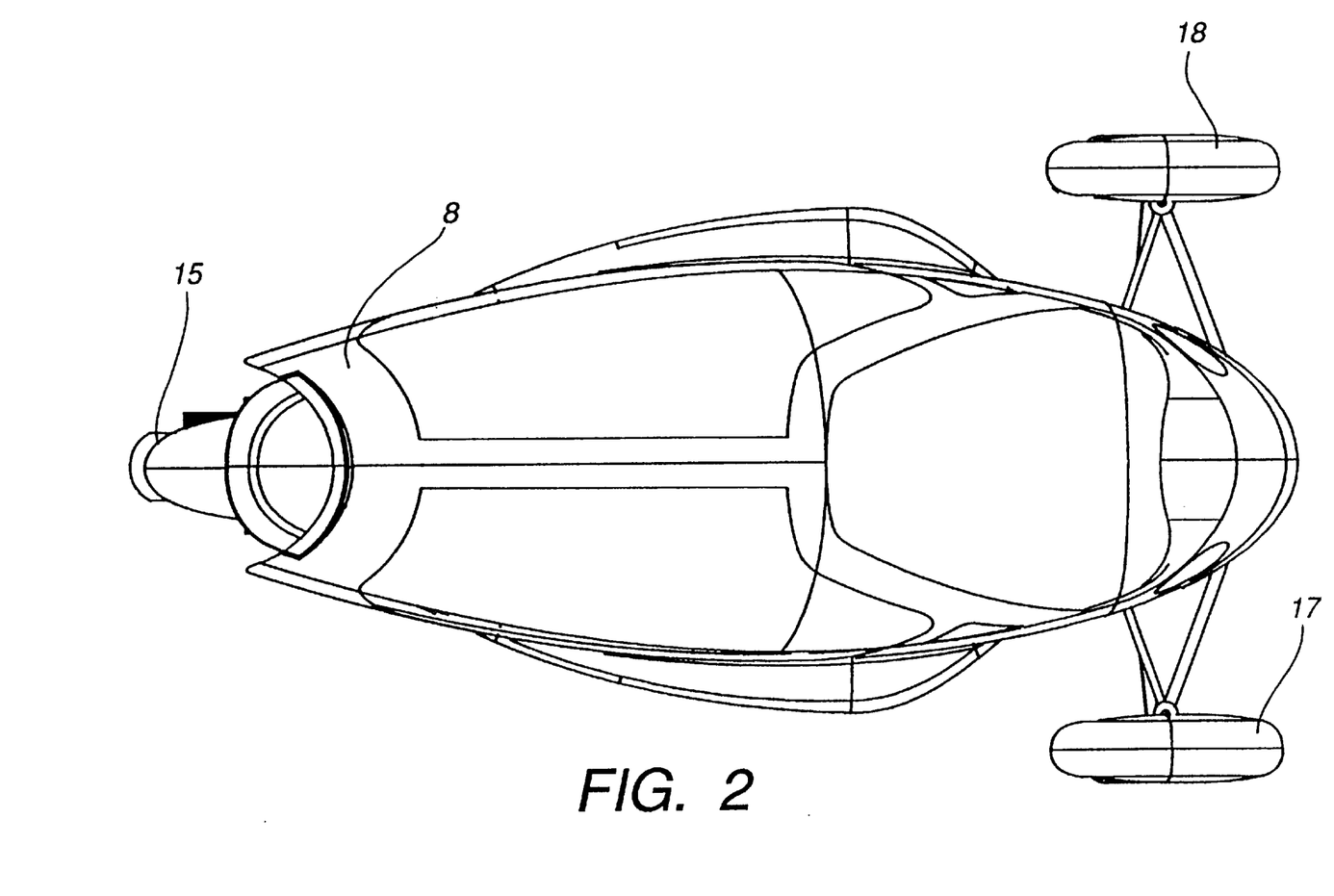
FIG. 2 represents a bird's eye view of the vehicle in FIG. 1.
Figure 3:
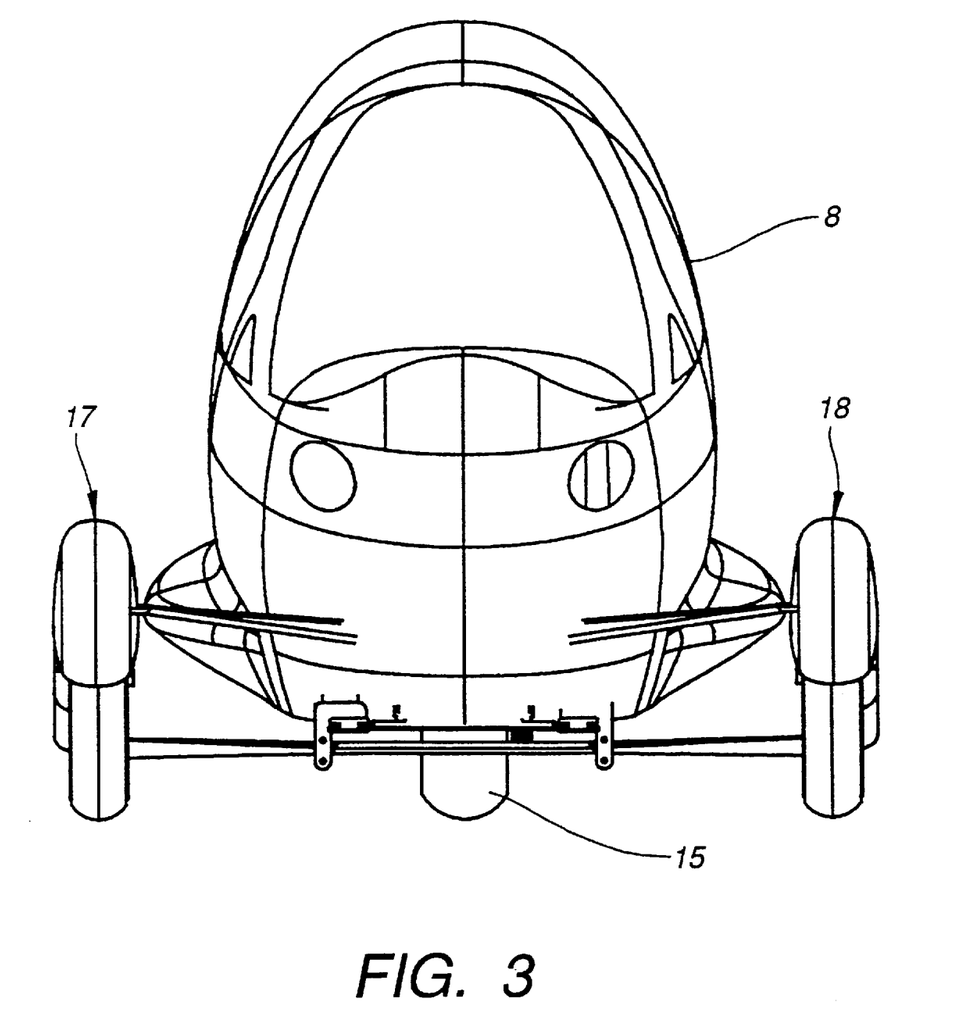
FIG. 3 is a front view of the vehicle in the preceding figures.

Referring to the figures, the ultra-light road vehicle 10 consists principally, as shown in FIGS. 1 to 3, of a supporting structure or chassis 9 and a passenger compartment or cell 8, a separate unit mounted on this chassis. It is equipped with three wheels arranged so that one 15 is located at the rear, approximately on the prolongation of the axis of the chassis, and the other two 17 and 18 at the front, each side of the chassis. The rear wheel provides the propulsion and the front wheels the steering.

Figure 4:
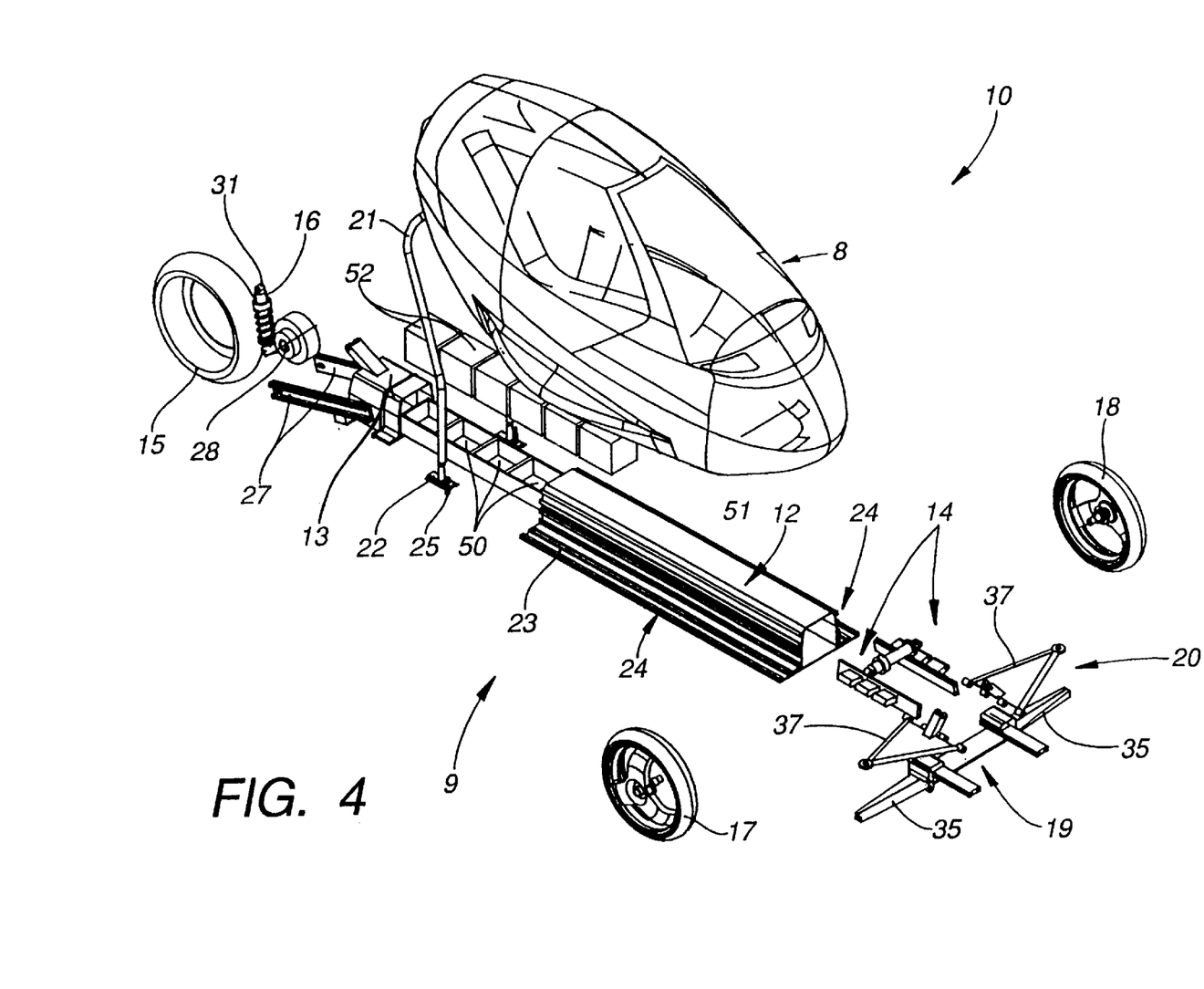
FIG. 4 shows an exploded view of the vehicle in accordance with the invention as shown in FIGS. 1 to 3.
Figure 5:
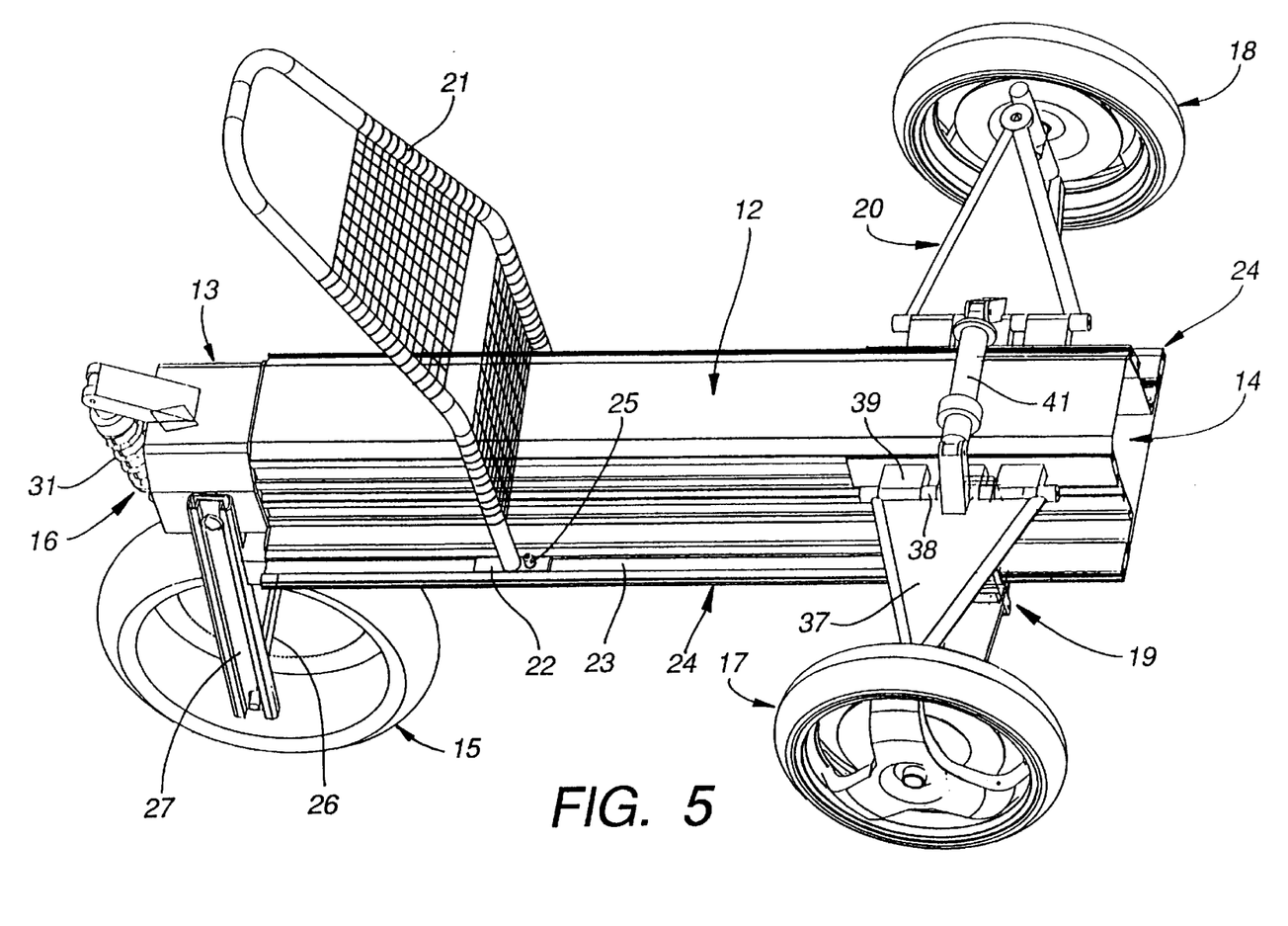
FIG. 5 shows a perspective view of the chassis of the vehicle in accordance with the invention.

As shown in greater detail in FIGS. 4 and 5, the chassis consists principally of a hollow central beam 12, made from extruded aluminium section having the cross-section of an inverted T, into the respective end profiles of which are inserted a rear plate 13 and two front plates 14.

The rear plate 13 carries the rear wheel 15 of the vehicle 10 and a spring-suspension unit 16 for this wheel. The front plates 14 of the vehicle 10 carry the front wheels 17 and 18 and their suspensions, 19 and 20 respectively. An arch-shaped bow constituting the frame 21 of the adjustable back of a seat made of cloth stretched between the arms of the bow is also fixed to the central beam. Specifically, the ends of this bow are equipped with two flange plates 22 each engaging in one of the grooves 23 of the two lateral webs 24 of the section constituting the aforementioned hollow central beam. The flange plates 22, and thus also the bow 21, are locked in position by means of spring loaded pins 25 engaging in holes drilled in the grooves 23.

Figure 9:
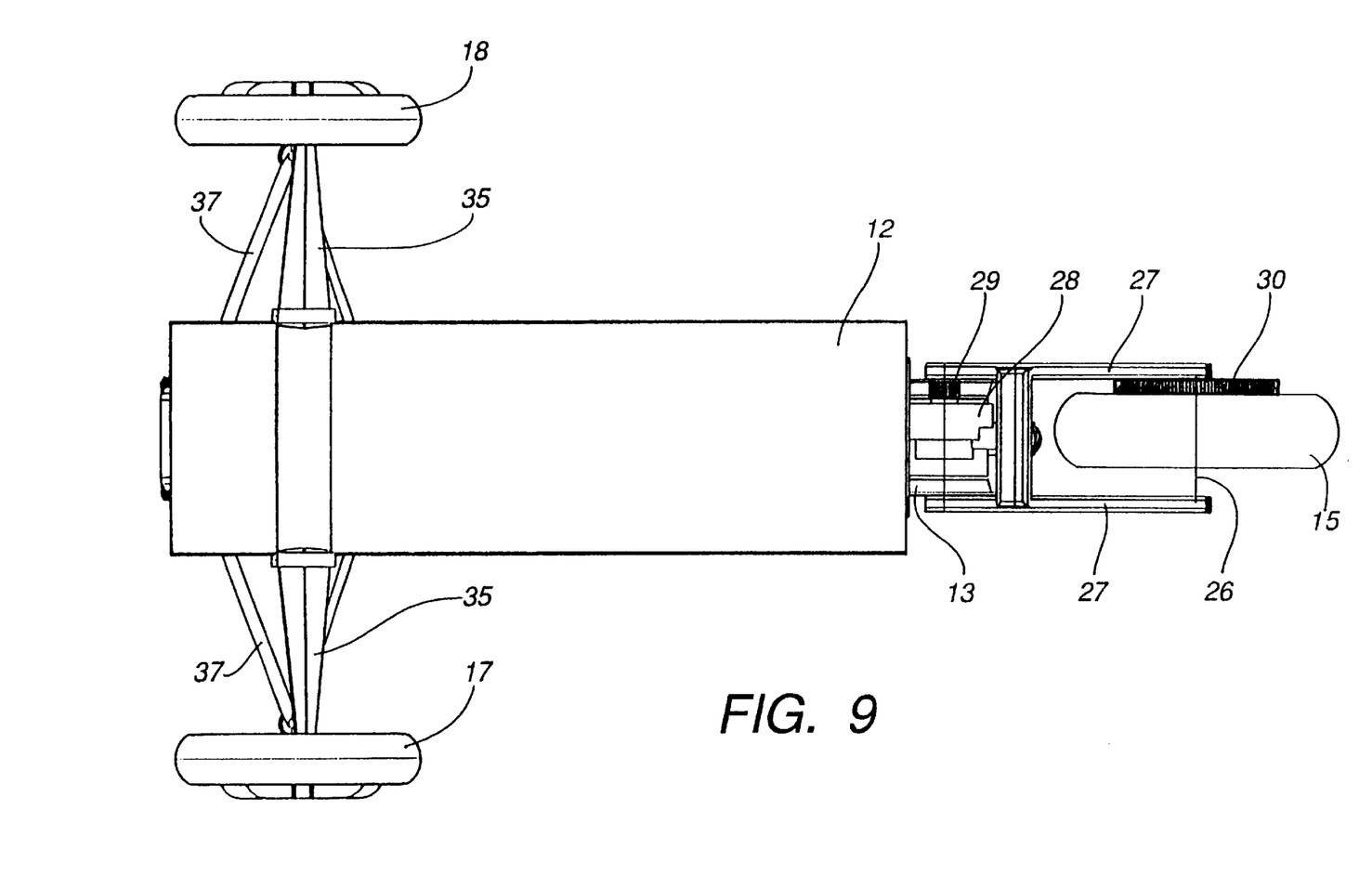

The rear wheel 15 is mounted on an axle 26 the ends of which are supported by a suspension arm 16 composed of two suspension arms 27 which form a oscillating support for this wheel. The two pivoting forks are articulated on to the rear plate 13, at the opposite end to that carrying the axle 26. This suspension arm 16 is so designed as to enable the vehicle to take up a normal position or shortened position which reduces its wheelbase by reason of the. fact that the pivoting arms 27, which carry the rear wheel 15, are arranged approximately along the prolongation of the axis of the central beam 12 when the vehicle is in normal position and are inclined with respect to this beam when the vehicle is in its shortened position. The rear plate 13 also carries an electric motor 28 whose output shaft is fitted with a drive pinion or sprocket 29 (see FIG. 9) intended to be coupled by a chain or belt to a drive pinion or sprocket 30 rigidly fixed to the rear wheel 15.

The suspension arm 16 carries a helicoidal spring 31 positioned coaxially around a shock absorber 32 mounted between a rigid arm 33 rigidly fixed to the rear plate 13 and a rigid supporting element to be defined below with reference to FIGS. 10 and 11.

Figure 6:
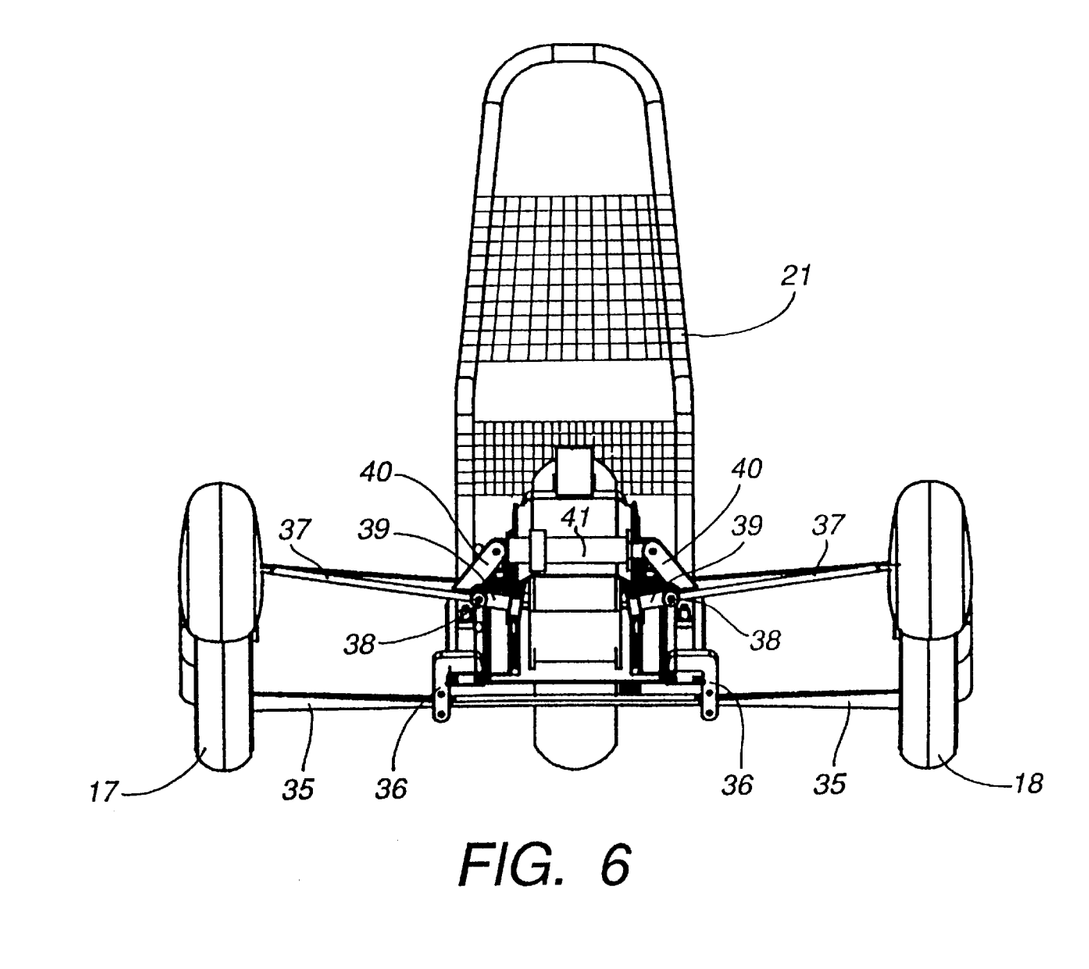
FIG. 6 is a front view of the chassis of the vehicle as shown in FIG. 5.
Figure 7:
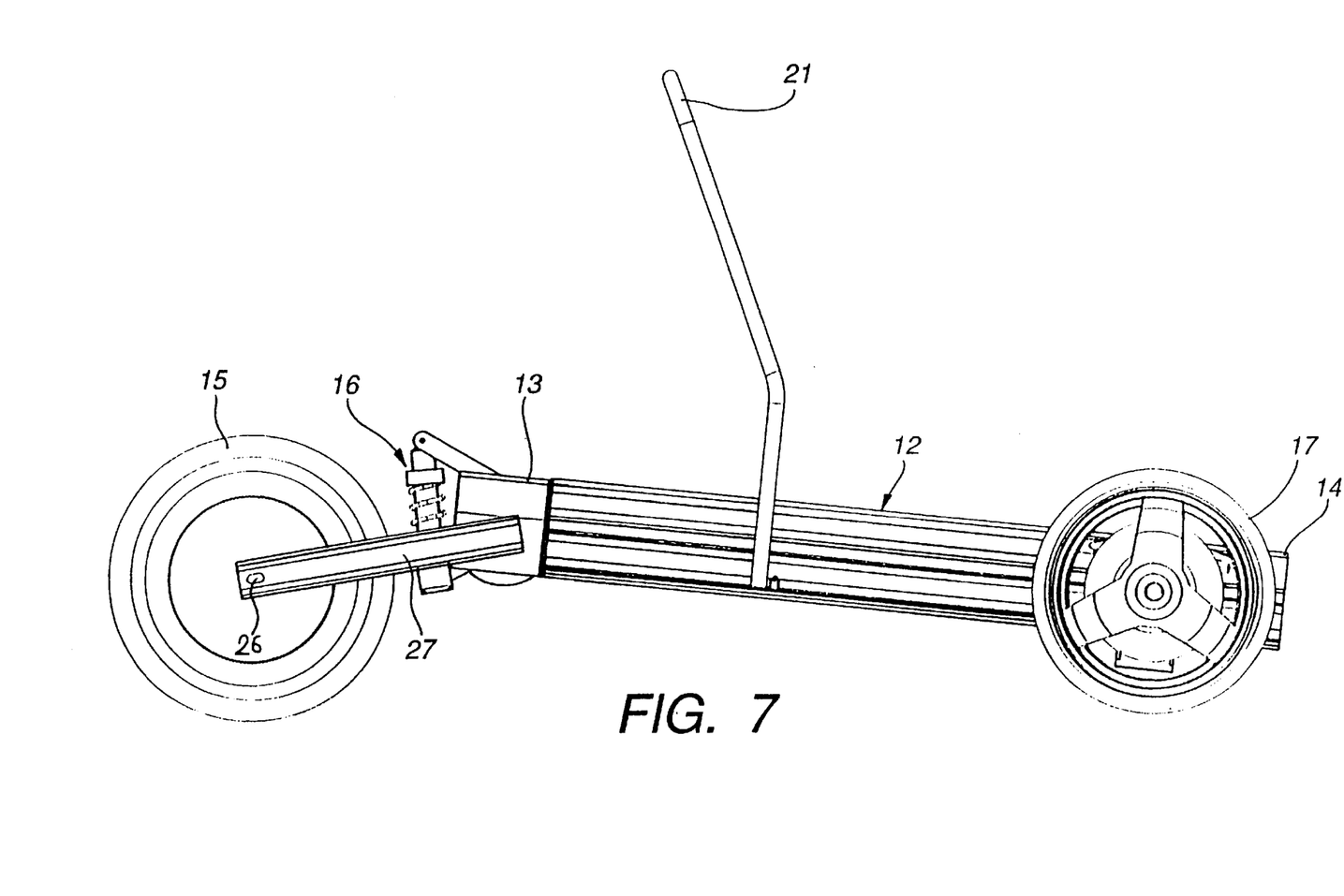
FIG. 7 is a side view of the chassis equipped with its wheels, in normal position.
Figure 8:
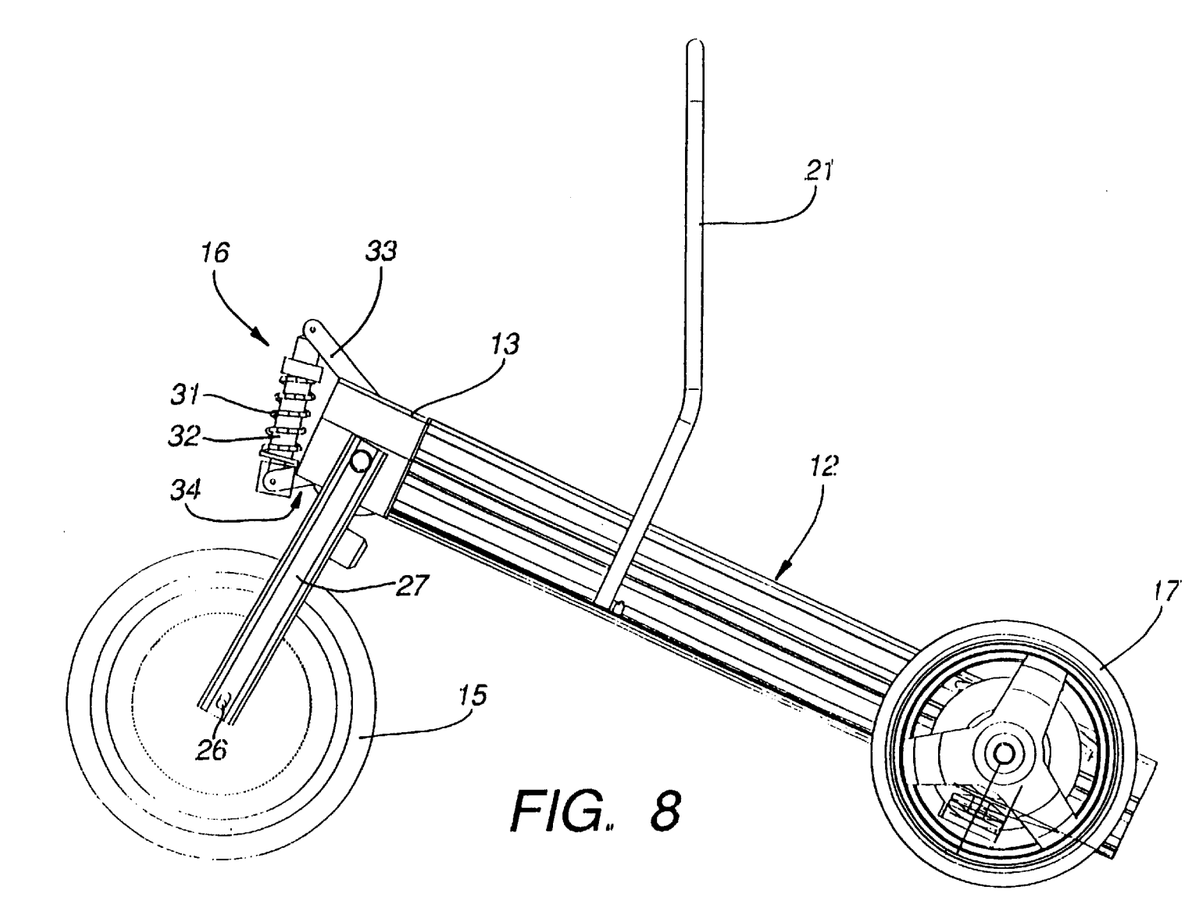
FIG. 8 is a view similar to that in FIG. 7, but with the chassis shown in shortened position, FIG. 9 show the chassis with its wheels, seen from above.

The front wheels 17 and 18 are connected to the chassis by wishbones rigidly fixed to the front plate 14, as shown in detail in FIG. 6. Each wheel is held by a lower suspension strip 35 jointed on to a part 36 rigidly fixed to the front plate 14, and by an upper suspension wishbone 37 pivoting on an axle 38 fixed by an appropriate support 39 to the same front plate 14. Each of the two upper suspension wishbones 37 is fitted with an obliquely mounted bell crank 40, the two bell cranks being linked together by a spring-suspension unit 41 which provides suspension and shock absorption for the whole front of the vehicle. The lower suspension strip 35 should preferably be made of a composite material.

The vehicle is designed primarily to be electrically propelled. The energy source consists of accumulator batteries housed inside the central beam 12 on a support sliding inside the beam and accessible for example by disassembly of the rear plate.

FIG. 4 shows in greater detail the interior of the central beam 12 and in particular a sliding support containing a row cells 50 formed in this support and designed to accept a series of accumulators 52. For installation and maintenance, the accumulators 52 are first positioned in the cells provided for the purpose, then the sliding support is introduced into the central beam at one end, specifically the rear end, the rear plate 13 being rigidly fixed to the sliding support 51, which is guided into the beam. This process is rendered easier by the fact that the sliding support is itself supported by the rear wheel.

Other components, such as the cables of the electrical harness, are also housed in the cavity of the central beam 12.

Figure 12A:
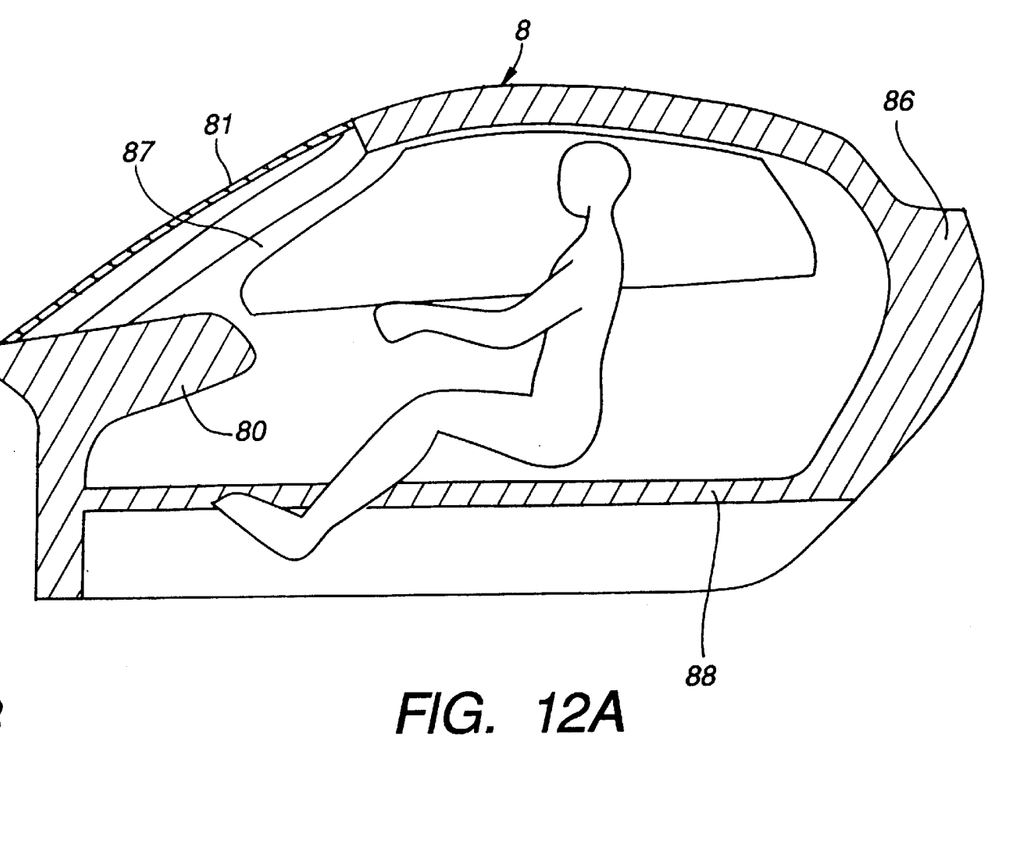
FIGS. 12A and 12B show partial cross-sectional views of the passenger compartment or separate cell of the vehicle.
Figure 12B:
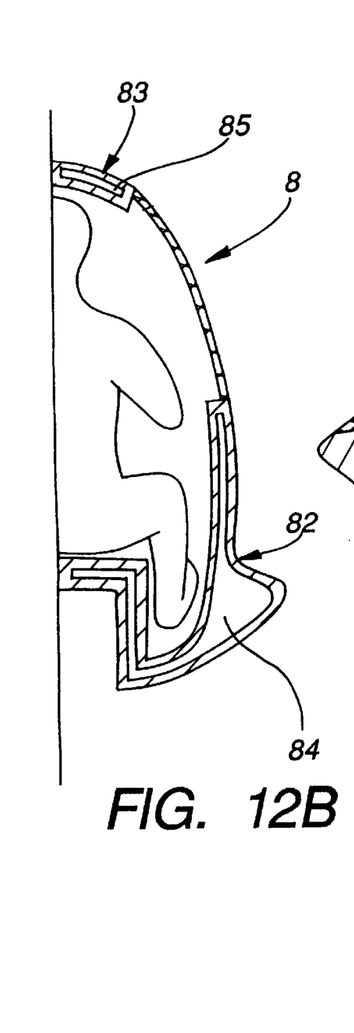

The cell or passenger compartment 8, which will be described with reference to FIGS. 12A and 12B, is mounted on the central beam 12 by suitable fastenings, by engagement in the grooves 23 of the hollow central beam 12 and by bolts or similar means. In practice, and in accordance with an advantageous mode of construction, the cell is fixed by four studs which engage in the grooves of the central beam. Two of these studs, for example the front ones, are fixed by bolts and two, for example the rear studs, are simply restrained without being fixed. In this way, expansion of the cell and changes in length can easily be absorbed. The cell is composed of a carcass of synthetic material, for example a material which lends itself to the techniques of rotational moulding or blown extrusion.

The cell is designed to contain two seats one behind the other. This arrangement makes possible a good, aerodynamic profile, favouring a reduction in air resistance and therefore in energy consumption.

Figure 10:
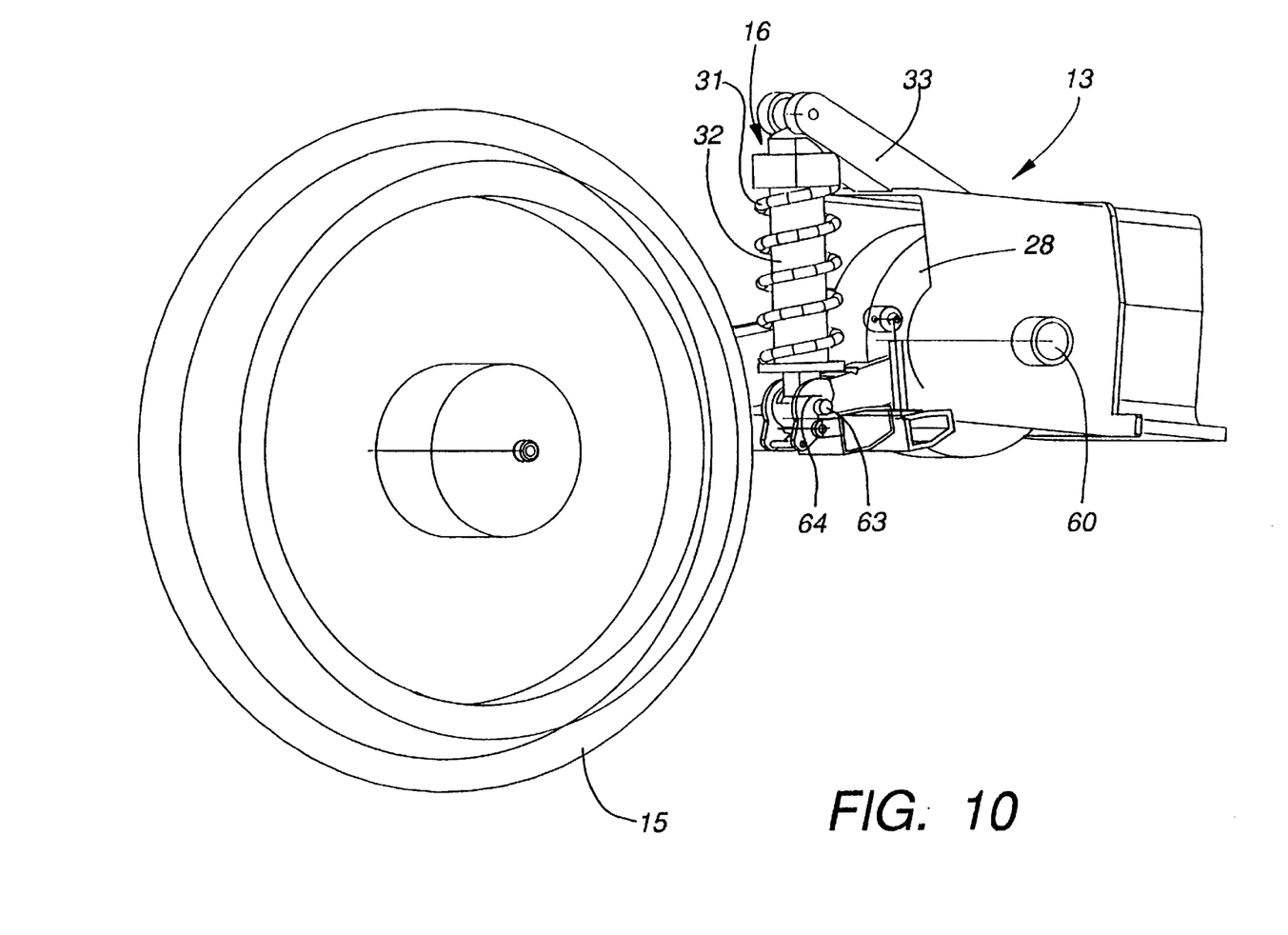
FIGS. 10 and 11 represent the rear wheel with its suspension, seen in perspective, in the normal and shortened positions of the vehicle respectively.
Figure 11:
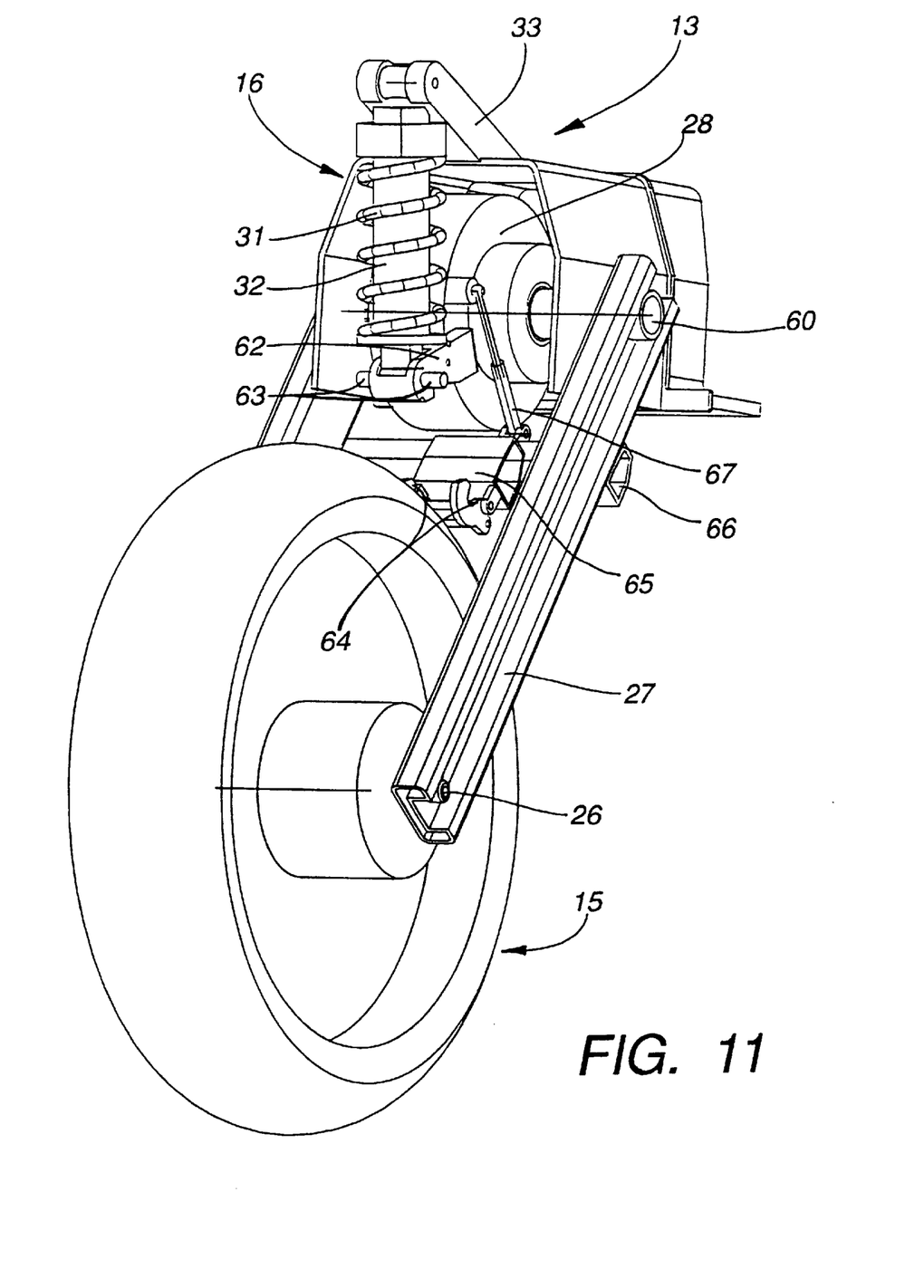

FIGS. 10 and 11 show in detail the rear wheel 15 and the rear suspension arm 16 of the vehicle, seen in perspective when the vehicle is in normal position and shortened position respectively. As these figures show, the rear wheel is supported by the pivoting forks 27 which are jointed to the rear plate 13 by means of a transverse axle 60 which carries the electric motor 28, lodged in the plate 13. This motor is mounted free to turn on this axle by means of a bearing. The housing of this motor carries a cradle 62, constituting the aforementioned supporting element defined above, which serves as a support for the lower end of the unit combining the spring 31 and shock absorber 32 of suspension arm 16, the upper end of which is jointed on to the rigid arm 33. It should be noted that the cradle 62 possesses two pins 63 extending laterally either side of the central part. These pins 63 are constructed so as to engage with two hooks 64 pivoting on a support 65 mounted on a cross-member 66 coupled to the two pivoting forks 27.

In the normal position shown in FIG. 10, the hooks 64 are engaged with the pins 63 so that the suspension, that is the combination of spring 31 and shock absorber 32, is operational, being coupled between the chassis and the suspension arms.

In the shortened position shown in FIG. 11, the hooks 64 are disengaged from the pins 63, and the wheel support is free to pivot about the axle 60. This is the structure which enables the vehicle to be brought into shortened position, reducing its wheelbase and facilitating parking. When the whole of the device described above is mechanical, this manoeuvre is effected as follows:

the hooks 64 are unlocked by means of a hydraulic cylinder or cable (not shown)

pressure is applied simultaneously to the brake pedal, which locks the front wheels, and to the accelerator pedal which causes the rear wheel to turn. This causes the rear of the vehicle to rise, lifted by the power of the propulsion motor.

The vehicle is maintained in shortened position or in an intermediate position by a pneumatic locking cylinder 67 which is open during the lifting phase and whose opening close at the end of its travel. Reduction of wheelbase by lifting of the rear of the chassis continues until cylinder 67 reaches its end stop (see FIG. 11).

While the vehicle is locked in this raised position, forward or reverse motion can be engaged for parking or similar manoeuvres. The vehicle can also be driven in shortened position, cylinder 67 transmitting the effort to the suspension of the rear wheel.

To restore the vehicle to its normal position, which corresponds to normal use on the road, a control is provided to unlock the locking cylinder 67 and so allow the vehicle to return to its normal position by the force of gravity.

The system described above is entirely mechanical, but it could also be partly or wholly automated.

The mechanical system is advantageous in that it requires only a minimum of parts and involves the shock absorber, enabling impacts against kerbs or other obstacles to be absorbed.

Referring to FIGS. 12A and 12B, the passenger compartment 8 comprises a completely separate cell which can be mounted on the hollow central beam of the vehicle simply by means of bolts. This cell is made out of plastic parts and is multifunctional, comprising at one and the same time the external bodywork, including such elements as supports for headlights and indicators, and the internal passenger compartment, with integral instrument panel, soundproofing and especially seat.

The cross-sectional view 12A shows the overall shape of the cell, which incorporates the instrument panel 80 and windscreen 81. The cross-sectional view 12B shows a lower part 82 and an upper part 83 which are constructed double-skinned with air cushions 84 and 85 incorporated. The side pillars 87 which partly support the windscreen, the rear end 86 of the cell and the floor 88 can also advantageously incorporate hollow zones which constitute air cushions and furthermore contribute to reducing the weight of the cell.

The cell or passenger compartment 8 can advantageously be constructed in several parts, for example three parts which are partially hollow, forming air cushions to absorb shocks. These parts are preferably assembled by welding to create zones of reinforcement along the weld seams.

The cell can be separated from the chassis by rupture of the studs should they be subjected to severe strain, especially in case of impact. Thanks to the presence of the air cushions, which constitute shock absorbers, the cell can become a survival compartment with less energy to dissipate than the rest of the vehicle, comprising chassis, wheels, motor, etc.

The cell can advantageously possess lateral protuberances serving as steps and also constituting absorbers of kinetic energy in case of impact, notably by reason of their special shape.

This construction ensures excellent passenger protection in case of impact.

The cell constructed as a hollow moulding can constitute a diffuser of light thanks to several light sources distributed about the bodywork to illuminate all of part of the vehicle at night.

The vehicle in accordance with the invention is particularly advantageous for a variety of reasons. For one thing, all the major components are easily disassembled and can be replaced at modest cost in case of damage. Assembly is simple and uses only simple equipment not requiring heavy investment for assembly. It should be noted, in particular, that the wheel suspensions are jointed on to the corresponding plates, enabling the manufacture of pre-fitted sub-assemblies. These plates are lodged in the hollow central beam and fixed with bolts. This mode of assembly enables the vehicle as defined by the invention to be made without recourse to the cumbersome infrastructure which is usual in the motor industry. Assembly is reduced to fitting pre-assembled modules, making it possible in particular to create small assembly plants near to localities of sale and use.

In addition, all the components are made from recyclable materials. At assembly, all working parts are fitted to the chassis, so that the vehicle is mobile in the factory, even without its passenger compartment.

Maintenance is very simple and can be carried out by people with no special qualifications.

The vehicle is economical in use and manoeuvring it is within the capacities of anybody.

The fact that the passengers sit astride the central beam which really comprises the main component makes it possible to create a vehicle which is simple, comprising less than a tenth of the number of components of a standard vehicle, at a low price, while at the same time possessing remarkable stability and roadholding and a particularly high safety factor.

I claim:

1. An ultra-light road vehicle comprising only a small number of components, specifically a vehicle of the type known as a "city car" for commuting use, in particular electrically propelled, comprising a supporting structure, two front wheels and one rear wheel mounted by suspensions on this supporting structure and a separate passenger compartment fitted on to the supporting structure, the supporting structure comprising a hollow central beam, characterized by the fact that this hollow central beam (12) is constituted from extruded section of lightweight material of constant cross-section, that the two front wheels (17, 18) provide the steering and the rear wheel (15) provides the propulsion and lies approximately on the axis of the aforementioned hollow central beam (12), that the propulsion motor (28) and energy storage are housed inside the hollow central beam (12), and that the separate passenger compartment is fixed as a unit to the hollow central beam (12).

2. Vehicle in accordance with claim 1, characterized by the fact that it possesses two front plates (14) and one rear plate (13), these plates being so constructed as to be lodged at least partially in the ends of the profiles of the aforementioned hollow central beam, and that these plates are adapted to carry, respectively, the suspensions of the front wheels (17, 18) and the rear wheel (15).

3. Vehicle in accordance with claim 1, characterized by the fact that the hollow central beam (12) possesses over its whole length the cross-section of an inverted T with its lower surface extended laterally in two lateral webs (24) arranged symmetrically with respect to the longitudinal median plane of this beam.

4. Vehicle in accordance with claim 3, characterized by the fact that the lateral webs (24) each possess at least one longitudinal groove (23) designed to accommodate components and/or accessories.

5. Vehicle in accordance with claim 2, characterized by the fact that the rear plate (13) carries a support for the rear wheel, this support including a spring-suspension unit (16) and two suspension arms (27), of which one end is fixed by an axle to this plate and the end carries the axle (26) of the rear wheel (15) which is located between the aforementioned suspension arms.

6. Vehicle in accordance with claim 5, characterized by the fact that the rear plate (13) carries one end of a spring-suspension unit (16), the other end being linked to the suspension arms (27) of the rear wheel.

7. Vehicle in accordance with claim 5, characterized by the fact that the suspension arm of the rear wheel (15) is so constructed as to enable the vehicle to take up a normal position or a shortened position, the pivoting forks (27) being located approximately on the prolongation of the axis of the central beam (12) when the vehicle is in its normal position, and these forks being inclined with respect to this central beam when the vehicle is in shortened position, the shortened position being attained by the functioning of the rear drive wheel simultaneously with locking of the steerable front wheels.

8. Vehicle in accordance with claim 5, characterized by the fact that the pivoting arms (27) are articulated on to the rear plate (13) and mounted on a transverse axle (60) carrying an electric motor (28) on the housing of which is mounted a cradle (62) which carries the lower end of the combination of spring (31) and shock absorber (32) of the suspension arm (16), the upper end of which is fixed to an arm (33) rigidly fixed to the rear plate (13).

9. Vehicle in accordance with claim 8, characterized by the fact that the cradle (62) carries two pins (63) which extend laterally either side of the cradle and are constructed so as to engage with two hooks (64) to lock the vehicle into its normal position.

10. Vehicle in accordance with claim 9, characterized by the fact that the hooks (64) are pivoted and articulated on to a support (65) carried on a cross-member (66) coupled to the two pivoting forks (27).

11. Vehicle in accordance with claim 8, characterized by the fact that it possesses a locking cylinder (67) designed to maintain the vehicle in its shortened position.

12. Vehicle in accordance with claim 11, characterized by the fact that the locking cylinder (67) is mounted between the motor (28) and the cross-member (66) carrying the hooks (64).

13. Vehicle in accordance with claim 4, characterized by the fact that it includes a bow (21) constituting a seat frame, the ends of this bow being equipped with two flange plates (22) each engaging in one of the aforementioned longitudinal grooves (23).

14. Vehicle in accordance with claim 1 characterized by the fact that the hollow central beam (12) includes a sliding support to contain at least one accumulator (52) as power supply for the propulsive electric motor (28).

15. Vehicle in accordance with claim 1, characterized by the fact that the passenger compartment (8) is a separate cell which is made of synthetic material and at least part of which is double-skinned and incorporates air cushions.

16. Vehicle in accordance with claim 15, characterized by the fact that the passenger compartment (8) is constructed at least partially by a technique of rotational moulding, hollow moulding or blown extrusion.

17. Vehicle in accordance with claim 15, characterized by the fact that the passenger compartment (8) is mounted on the hollow central beam (12) by means of studs engaged in the grooves (23).

18. Vehicle in accordance with claim 17, characterized by the fact that the aforementioned studs are four in number, two each side of the hollow central beam (12) being fixed, and the other two sliding in the aforementioned grooves (23).

19. Vehicle in accordance with claim 1, characterized by the fact that the hollow central beam (12) contains a sliding support (51) containing at least one accumulator battery (52) providing the power supply for the propulsive electric motor (28).

20. Vehicle in accordance with claim 19, characterized by the fact that the aforementioned sliding support (51) is rigidly fixed to the rear plate.

21. Vehicle in accordance with claim 1, characterized by the fact that the extruded hollow central beam (12), closed at both ends, constitutes a fuel tank for an internal combustion engine.

22. Vehicle in accordance with claim 15, characterized by the fact that the passenger compartment (8) comprises several component parts assembled by welding, the welding seams constituting zones of reinforcement.

23. Vehicle in accordance with claim 15, characterized by the fact that the passenger compartment (8) constitutes a survival cell attached to the hollow central beam (12) by studs which are detachable in case of impact.

24. Vehicle in accordance with claim 15, characterized by the fact that the passenger compartment (8) possesses lateral protuberances which serve as a step and as an energy absorber.

25. Vehicle in accordance with claim 15, characterized by the fact that the passenger compartment (8), constructed as a hollow moulding, includes means to diffuse light from at least one source.

* * * * *